(12) United States Patent
Soejima

(10) Patent No.: US 11,467,103 B2
(45) Date of Patent: Oct. 11, 2022

(54) X-RAY ANALYZER

(71) Applicant: APPLIED SCIENCE LABORATORY CO., LTD, Kyoto (JP)

(72) Inventor: Hiroyoshi Soejima, Otokuni-gun (JP)

(73) Assignee: APPLIED SCIENCE LABORATORY CO., LTD., Kyoto (JP)

( * ) Notice: Subject to any disclaimer, the term of this patent is extended or adjusted under 35 U.S.C. 154(b) by 0 days.

(21) Appl. No.: 17/059,838

(22) PCT Filed: Jan. 24, 2020

(86) PCT No.: PCT/JP2020/002468
§ 371 (c)(1),
(2) Date: Nov. 30, 2020

(87) PCT Pub. No.: WO2020/202730
PCT Pub. Date: Oct. 8, 2020

(65) Prior Publication Data
US 2022/0003691 A1 Jan. 6, 2022

(30) Foreign Application Priority Data
Mar. 29, 2019 (JP) .............................. JP2019-067958

(51) Int. Cl.
*G01N 23/085* (2018.01)
*G01N 23/20008* (2018.01)
(Continued)

(52) U.S. Cl.
CPC ......... *G01N 23/085* (2018.02); *G01N 23/207* (2013.01); *G01N 23/20008* (2013.01);
(Continued)

(58) Field of Classification Search
None
See application file for complete search history.

(56) References Cited

U.S. PATENT DOCUMENTS

| 10,416,099 B2* | 9/2019 | Yun | H01J 35/08 |
| 2019/0011379 A1* | 1/2019 | Yun | H01J 35/12 |
| 2022/0003691 A1* | 1/2022 | Soejima | G01N 23/085 |

FOREIGN PATENT DOCUMENTS

| JP | H07-011600 B2 | 2/1995 |
| JP | 4492507 B2 | 6/2010 |

(Continued)

OTHER PUBLICATIONS

Snigirev, et al. "Two-Step Hard X-ray Focusing Combining Fresnel Zone Plate and One-Bounce Elliptical Capillary." J. Synchrotron Radiation (2007) vol. 14, p. 326-330 (Year: 2007).*

(Continued)

*Primary Examiner* — Thomas R Artman
(74) *Attorney, Agent, or Firm* — Oliff PLC

(57) ABSTRACT

An X-ray analyzer includes an X-ray source, a straight tube type multi-capillary, a flat plate spectroscopic crystal, a parallel/point focus type multi-capillary X-ray lens, and a Fresnel zone plate. A qualitative analysis is performed over an area on the sample, the flat plate spectroscopic crystal and the Fresnel zone plate are removed from the X-ray optical path, and X-rays are collected by the multi-capillary lens and the sample is irradiated. When analyzing the chemical morphology of an element, the multi-capillary lens retracts from the optical path, the source rotates, and the flat plate spectroscopic crystal and the Fresnel zone plate are inserted on the optical path. A narrow sample area is irradiated by the Fresnel zone plate with X-rays having energy extracted from the flat plate spectroscopic crystal. This makes it possible to carry out accurate qualitative analysis on the sample and perform detailed analysis of more minute parts.

8 Claims, 6 Drawing Sheets

(51) Int. Cl.
  *G01N 23/207* (2018.01)
  *G01N 23/223* (2006.01)
  *G01N 23/2273* (2018.01)
  *G01N 23/2206* (2018.01)
  *G01N 23/2209* (2018.01)
  *G21K 1/06* (2006.01)

(52) U.S. Cl.
  CPC ....... *G01N 23/2076* (2013.01); *G01N 23/223* (2013.01); *G01N 23/2206* (2013.01); *G01N 23/2209* (2018.02); *G01N 23/2273* (2013.01); *G01N 2223/041* (2013.01); *G01N 2223/056* (2013.01); *G01N 2223/071* (2013.01); *G01N 2223/076* (2013.01); *G01N 2223/085* (2013.01); *G01N 2223/1016* (2013.01); *G01N 2223/316* (2013.01); *G01N 2223/66* (2013.01); *G21K 1/065* (2013.01); *G21K 1/067* (2013.01)

(56) References Cited

FOREIGN PATENT DOCUMENTS

| | | |
|---|---|---|
| JP | 5338483 B2 | 11/2013 |
| JP | 6430208 B2 | 11/2018 |
| WO | WO-2018175570 A1 * 9/2018 | ........... G01N 23/085 |

OTHER PUBLICATIONS

Apr. 7, 2020 Written Opinion of the International Searching Authority issued in International Patent Application No. PCT/JP2020/002468.

* cited by examiner

X-RAY ANALYZER

TECHNICAL FIELD

The present invention relates to an X-ray analyzer that irradiates a subject with X-rays to analyze and observe the subject.

BACKGROUND ART

An X-ray analysis method has been known which analyzes and observes a sample by irradiating a sample with X-rays and detecting X-rays, electrons, ions, or other particles emitted from the sample or detecting X-rays passing through the sample. Typical X-ray analysis methods include X-ray fluorescence analysis, X-ray diffraction, X-ray photoelectron spectroscopy, and X-ray absorption fine structure. Among these, the X-Ray Fluorescence analysis (XRF) is a typical analysis method for non-destructive, highly accurate qualitative and quantitative analysis of substances including trace elements. The X-Ray diffraction (XRD) is a typical structural analysis method. In addition, the X-ray photoelectron spectroscopy (XPS) can be used for elemental analysis and state analysis of the very surface of a sample, and the X-ray absorption fine structure (XAFS) can be used for the electronic structure of an absorption atom.

In an X-ray fluorescence analyzer, in order to observe a minute region and to improve the spatial resolution of analysis, it is necessary to narrow down the irradiation diameter or irradiation area of the X-ray in which the sample or the target region on the sample is irradiated as small as possible. On the other hand, for performing a precise X-ray diffraction, it is necessary to irradiate the sample with monochromatic X-rays having high parallelism.

In an X-ray analyzer such as an X-ray fluorescence analyzer, a multi-capillary X-ray lens disclosed in Patent Literature 1 and other documents is widely used in order to irradiate a minute region on a sample with X-rays with high efficiency.

The multi-capillary X-ray lens is an element which is formed by bundling a large number of thin glass capillaries having inner diameter of about 2 to over ten μm to a single cable. It efficiently guides X-rays by utilizing the phenomenon that X-rays incident in the hole of each capillary travel through the hole while totally reflected on the glass wall of the hole at an angle equal to or less than a critical angle. In at least one end, the end is configured as a point focus end face in which each capillary is arranged so that the central axes of the capillaries intersect at one point at a predetermined position outside the end face. As a result, the X-rays guided through the capillaries can be emitted so as to be focused at substantially one point.

The multi-capillary X-ray lens is a useful element for efficiently guiding X-rays and irradiating a minute area with the X-rays, but it is not always efficient in terms of narrowing down the area for irradiating the gathered X-rays. The main reason for this is that multi-capillary X-ray lenses cause blurring in principle. That is, in a multi-capillary X-ray lens, X-rays travel while being totally reflected by the inner wall surface of each capillary, and the maximum incident angle that causes total reflection (here the incident angle is the angle with respect to the reflecting surface according to usage, and the present specification will follow the definition) is the critical angle. Therefore, when X-rays are emitted from an end of the capillary, the X-rays spread with an opening angle less than the critical angle with respect to the central axis of the capillary. As a result, the irradiation region of X-rays emitted from the point focus end face of the multi-capillary X-ray lens is not an ideal point, but a region having a certain size.

On the other hand, an element capable of converging X-rays to a smaller diameter in principle is the Fresnel zone plate described in Patent Literature 2 and other literatures. A Fresnel zone plate is a substantially disk-shaped element that collects light using diffraction and interference, and is a kind of transmission type diffraction grating in which stop regions that stop X-rays and passing regions that allow X-rays to pass are alternately formed concentrically. In synchrotron radiation facilities, X-ray irradiation with the diameter of submicron to nano level is realized by using such a Fresnel zone plate.

Further, in order to utilize the characteristics of the multi-capillary X-ray lens and the Fresnel zone plate, a device combining them has also been proposed in Patent Literatures 2 and 3. According to the combination of the multi-capillary X-ray lens and the Fresnel zone plate, the X-ray irradiation diameter can be considerably reduced in principle as compared with the multi-capillary X-ray lens alone, and it is very useful for analyzing components present in a very narrow region of a sample. Further, Patent Literature 4 proposes a device that combines a parallel-end-parallel-end type multi-capillary and a Fresnel zone plate in which the central axes of respective capillaries are arranged in straight and parallel, and a device in in which a collimator is arranged to produce parallel X-rays in the front stage of the multi-capillary. In such a device, the parallelism of the X-rays incident on the Fresnel zone plate can be further enhanced, and the high focusing performance of the Fresnel zone plate can be further utilized.

CITATION LIST

Patent Literature

Patent Literature 1: JP 2001797 B2
Patent Literature 2: JP 4492507 B2
Patent Literature 3: JP 5338483 B2
Patent Literature 4: JP 6430208 B2

SUMMARY OF INVENTION

Technical Problem

In the X-ray fluorescence analysis, which is one of the typical analysis techniques using X-rays, the sample to be analyzed is irradiated with X-rays, and characteristic X-rays having the wavelength/energy corresponding to the elements constituting the sample are generated. Since excitation energies for respective elements are required to generate the characteristic X-rays, continuous X-rays having continuous energy are used as the X-rays to irradiate the sample. On the other hand, an X-ray beam with an irradiation diameter as small as possible is desirable for analysis of a minute region on the sample, and the Fresnel zone plate capable of narrowing the X-rays to the smallest is suitable for that purpose. However, the X-ray irradiation device using the Fresnel zone plate has the following problems.

Normally, a sample to be analyzed by X-ray contains various substances. Therefore, prior to the analysis of the minute region as described above, it is necessary to analyze a wider region on the sample including the minute region to determine what kind of substances exist. That is, a qualitative analysis over a certain wide area on the sample is required. FIGS. 5A-5B are conceptual diagrams illustrating the state of convergence of X-rays by the Fresnel zone plate on the surface of the sample.

Now, as illustrated in FIG. 5A, it is assumed that a flux of parallel X-rays having various energies enters the Fresnel zone plate 100 from the left side. The diffraction angle in the Fresnel zone plate 100 differs depending on the wavelength. Therefore, as illustrated in FIG. 5A, the positions of the focus points where the X-rays of different energies A, B, and C (where A<B<C) converge are different on the central axis X of the Fresnel zone plate 100. Therefore, when an X-ray irradiation surface 101 is located at an X-ray focus position of the energy B, the X-ray irradiation spot on the X-ray irradiation surface 101 is formed such that the area 102 where X-rays having the energies A, B, and C reach, the area 103 where X-rays having the energies A and C reach, and the area 104 where only X-rays having the energy A reach lie substantially concentrically as illustrated in FIG. 5B. At this time, the area 102 is irradiated with X-rays having the energy B with the strongest intensity.

It is assumed that elements contained in a sample placed on the X-ray irradiation surface 101 are detected by X-ray fluorescence analysis, and now, light elements and heavy elements are distributed as in FIG. 6A in the X-ray irradiation spot of FIG. 5B. In the inner area 103 where both low-energy X-rays and high-energy X-rays are irradiated, both heavy elements and light elements are detected efficiently. On the other hand, in the outermost area 104 where only low-energy X-rays are irradiated, light elements are detected but heavy elements are not detected. That is, although light elements a in FIG. 6A are detected, heavy elements d, a part of heavy elements e, and heavy elements inside the double structure f are not detected. As a result, the heavy elements d are overlooked, the heavy elements e are determined to have an inaccurate needle-like structure length, and the double structure f is detected as a mere simple light element region.

As described above, the conventional X-ray analyzer using the Fresnel zone plate in the X-ray irradiation device can analyze a specific element that is known to exist in a very narrow area in advance, but accurate qualitative analysis of unknown elements cannot be performed in a wide area.

The present invention has been made to solve the above problems, and an object of the present invention is to carry out accurate elemental qualitative analysis over a wide area, and then provide an X-ray analyzer which can perform detailed analysis of a specific element in a minute part.

Solution to Problem

According to the present invention which has been made to solve the above problems, there is provided an X-ray analyzer for irradiating a sample containing various components with X-rays to detect X-rays emitted from the sample, where the X-ray irradiation unit that irradiates the sample with X-rays includes:

a) an X-ray source configured to emit X-rays, b) a first multi-capillary which is composed of a large number of X-ray guiding capillaries parallel to each other, and has an incident end face arranged at a position where X-rays emitted from the X-ray source are introduced, c) a second multi-capillary which is composed of a large number of X-ray guiding capillaries, and is a parallel/point focus type multi-capillary X-ray lens formed such that the capillaries are parallel on an incident end side and mildly curved and converged at one point on an exit end side, d) a Fresnel zone plate, and e) a first moving section configured to move the second multi-capillary and the Fresnel zone plate such that one of the second multi-capillary and the Fresnel zone plate is selectively inserted on an X-ray optical path from the first multi-capillary to the sample.

Further, the X-ray analyzer according to the present invention may include a first X-ray detector configured to detect X-rays emitted from the sample in response to the X-rays irradiated to the sample through the second multi-capillary or the Fresnel zone plate.

In the present invention, the X-rays emitted from the X-ray source are introduced into the first multi-capillary. Since low parallel X-rays are removed in the process of passing through each capillary of the first multi-capillary, a highly parallel X-ray flux is emitted from the first multi-capillary. Either the second multi-capillary or the Fresnel zone plate is placed between the exit end face of the first multi-capillary and the sample to be analyzed by the first moving section. The second multi-capillary is selected when an accurate qualitative analysis is required for a component existing in a relatively wide area on the sample. On the other hand, the Fresnel zone plate is selected when a detailed analysis is required for a specific component in a very narrow area on the sample.

As the second multi-capillary, for example, a parallel/point focus type multi-capillary X-ray lens as disclosed in Patent Literature 2 or the like is used.

With this multi-capillary X-ray lens, it is possible to narrow down and emit X-rays introduced into a large number of X-ray guiding capillaries while guiding them without waste. In this case, although it is not possible to narrow down the X-rays to a very minute diameter due to blurring that occurs in principle, the loss in the process of the X-rays passing through the X-ray guiding capillaries is small, so the X-rays having a relatively large strength can be emitted. Moreover, the focal distance of X-rays of all energies is the same.

When the second multi-capillary, rather than the Fresnel zone plate, is placed between the exit end face of the first multi-capillary and the sample, X-rays are irradiated to a relatively wide area on the sample. Since there is almost no energy selectivity in the process of passing through the multi-capillary, if the X-rays emitted from the X-ray source are continuous X-rays over a predetermined energy range, all of the above areas on the sample are irradiated with continuous X-rays, and their focal distances are the same. As a result, elements, irrespective of light elements or heavy elements, existing in the area to be irradiated with X-rays are excited, and X-rays characteristic to the elements are emitted. By detecting this X-ray with the first X-ray detector, it is possible to identify an element or elements existing in a certain area on the sample.

On the other hand, if the Fresnel zone plate, rather than the second multi-capillary, is placed between the exit end face of the first multi-capillary and the sample, the highly parallel X-rays emitted from the first multi-capillary enter the Fresnel zone plate. X-rays diffracted by the Fresnel zone plate are focused on a very minute area on the sample. Therefore, at this time, X-rays are emitted to a fairly narrow area on the sample. If the sample is set at a position of the X-ray focal distance of a specific component among the components qualitatively analyzed using the second multi-capillary, it is possible to perform a precise analysis of the specific component (element) in a minute area. Further, if the X-ray introduced into the Fresnel zone plate is monochromatic X-ray and its energy is changed in a predetermined range, it is possible to obtain detailed information such as the chemical state of the element existing in the minute part on the sample using X-ray absorption spectroscopy.

In the X-ray analyzer according to the present invention, the X-ray irradiation unit may further include a first rotating section which rotates the X-ray source and the first multi-capillary integrally, a flat plate spectroscopic crystal, and a second moving section which moves the flat plate spectroscopic crystal such that the flat plate spectroscopic crystal is placed at a position where the X-ray emitted from an exit end face of the first multi-capillary reaches.

In this configuration, when irradiating the sample with X-rays having a minute diameter using, for example, a Fresnel zone plate, the X-ray source and the first multi-capillary are integrally rotated by a predetermined angle by the first rotating section, the flat plate spectroscopic crystal is placed by the second moving section at a position where the X-rays emitted from the exit end face of the first multi-capillary reached, and the incident angle of the X-rays on the crystal plane is adjusted to be an angle corresponding to the predetermined angle. Then, X-rays having a specific energy extracted by the flat plate spectroscopic crystal, that is, monochromatic X-rays are introduced into the Fresnel zone plate and irradiated from the Fresnel zone plate to a narrow area on the sample. At this time, since there is no X-ray of energy other than monochromatic X-ray, the focus becomes clear and precise analysis can be performed only by the characteristic X-ray of a specific element. Further, by changing the angle at which the X-ray source and the first multi-capillary are rotated and the angle of the flat plate spectroscopic crystal in conjunction with each other, it is possible to change the energy of X-rays irradiating a narrow area on the sample. This makes it possible to analyze the distribution of each of a plurality of elements in a minute area and to analyze a minute part using X-ray absorption spectroscopy.

Further, the X-ray analyzer having the above configuration may further include a second X-ray detector which is arranged at a position where an X-ray diffracted from an X-ray diffraction analysis sample placed at a position where the sample is placed, and a second rotating section which rotates the X-ray diffraction analysis sample and the second X-ray detector while maintaining a predetermined relationship. The second multi-capillary and the Fresnel zone plate are both retracted from an optical path of an X-ray emitted from the first multi-capillary or an X-ray emitted from the first multi-capillary and hit the flat plate spectroscopic crystal, and a diffracted X-ray corresponding to an X-ray irradiated to the X-ray diffraction analysis sample is detected by the second X-ray detector.

According to this configuration, an X-ray diffraction analysis can be made by irradiating the diffraction analysis sample with a parallel X-ray flux monochromized by, for example, the flat plate spectroscopic crystal. At this time, by rotating the X-ray diffraction analysis sample and the second X-ray detector with the second rotating section maintaining a predetermined relationship between them, it is possible to detect diffracted X-rays having different diffraction angles. As a result, it is possible to carry out a precise analysis of the crystal structure of the bulk sample as it is, as well as a powder sample and a thin film sample.

Further, the X-ray analyzer having the above configuration may further include a third moving section which moves the Fresnel zone plate on an optical axis. By controlling the third moving section and the first rotating section such that a position on an optical axis of the Fresnel zone plate and an energy or wavelength of an X-ray extracted from the flat plate spectroscopic crystal are changed in conjunction with each other, the sample can always be positioned at a focal distance position of an X-ray having a predetermined energy or wavelength.

According to this configuration, the energy or wavelength of monochromatic X-rays irradiating a minute area on a sample can be changed continuously or in a stepwise manner, so that detailed analysis of various elements existing in the minute region can be made.

Further, the X-ray analyzer having the above configuration may further include a photoelectron spectroscopic detector which detects photoelectrons emitted from the sample in response to irradiation of an X-ray extracted by the flat plate spectroscopic crystal.

According to this configuration, owing to the photoelectron spectroscopic analysis, elemental analysis and state analysis of the very surface of the sample are possible. Further, in general, in the X-ray photoelectron spectroscopy, an X-ray having a specific wavelength (energy) such as AlKα ray or CrK ray is irradiated to a sample, but according to the above configuration, the wavelength (energy) of the X-ray to irradiate the sample can be easily changed, so that the range of application of X-ray photoelectron spectroscopy can be expanded.

Further, in the X-ray analyzer having the above configuration, by rotating the X-ray source and the first multi-capillary integrally by the first rotating section, and detecting an X-ray emitted from the sample in response to the irradiation of an X-ray extracted by the flat plate spectroscopic crystal, an absorption edge spectrum can be obtained.

According to this configuration, X-ray absorption fine structure analysis can be performed, and the electronic structure of atoms in the sample can also be analyzed.

Advantageous Effects of Invention

According to an X-ray analyzer according to the present invention, the qualification of the components in a region of about 10 μm to 100 μm on a sample is accurately performed, and detailed analysis can be performed with a spatial resolution as good as about 1 μm or less for a specific component in the sample.

DESCRIPTION OF EMBODIMENTS

Hereinafter, an embodiment of the X-ray analyzer according to the present invention will be described with reference to the accompanying drawings.

Figure 1A:
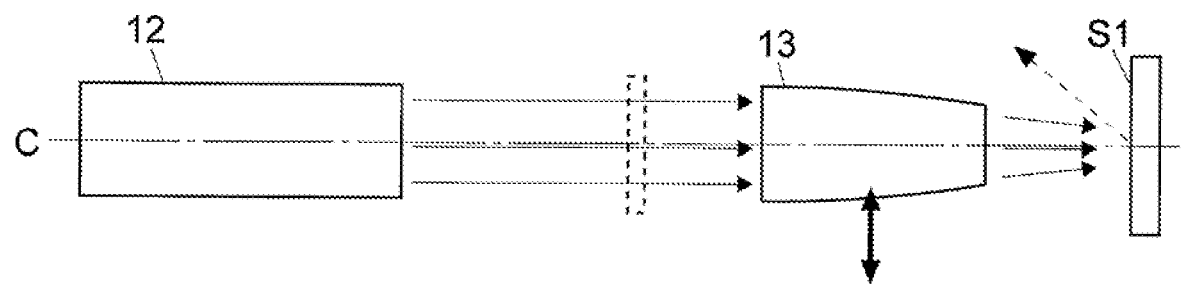
FIGS. 1A-1B are principle configuration diagrams of an X-ray analyzer according to an embodiment of the present invention.
Figure 1B:
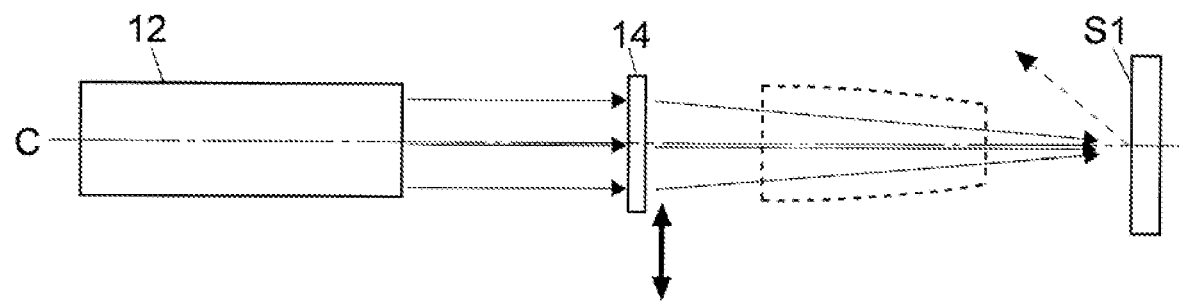
Figure 2A:
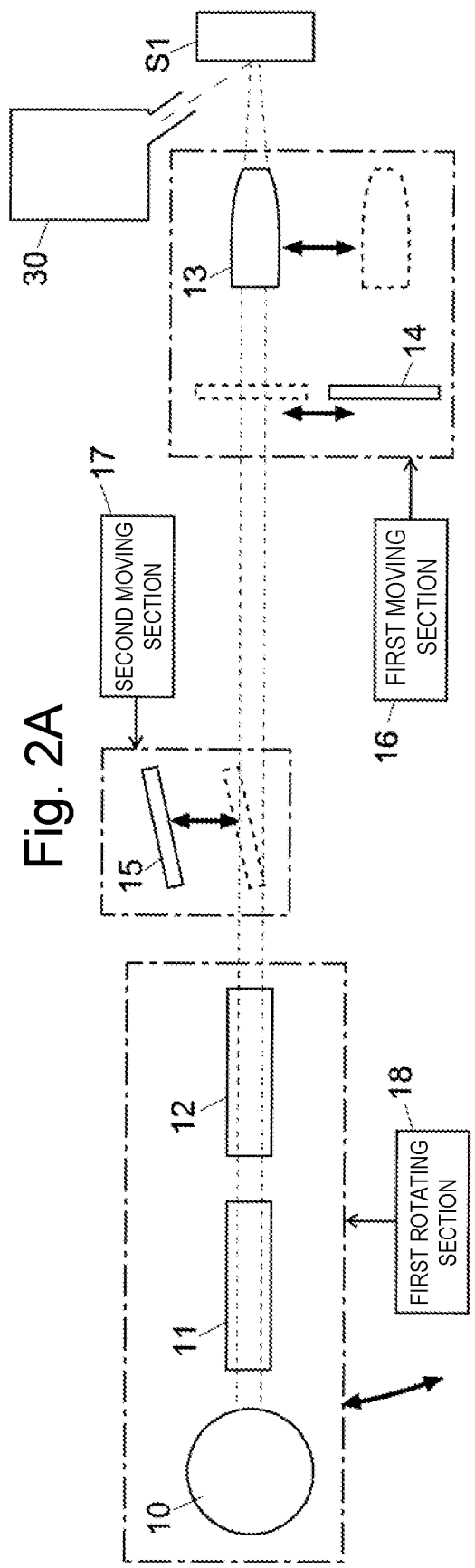
FIGS. 2A-2B are schematic configuration diagrams of main parts of an X-ray analyzer according to an embodiment of the present invention.
Figure 2B:
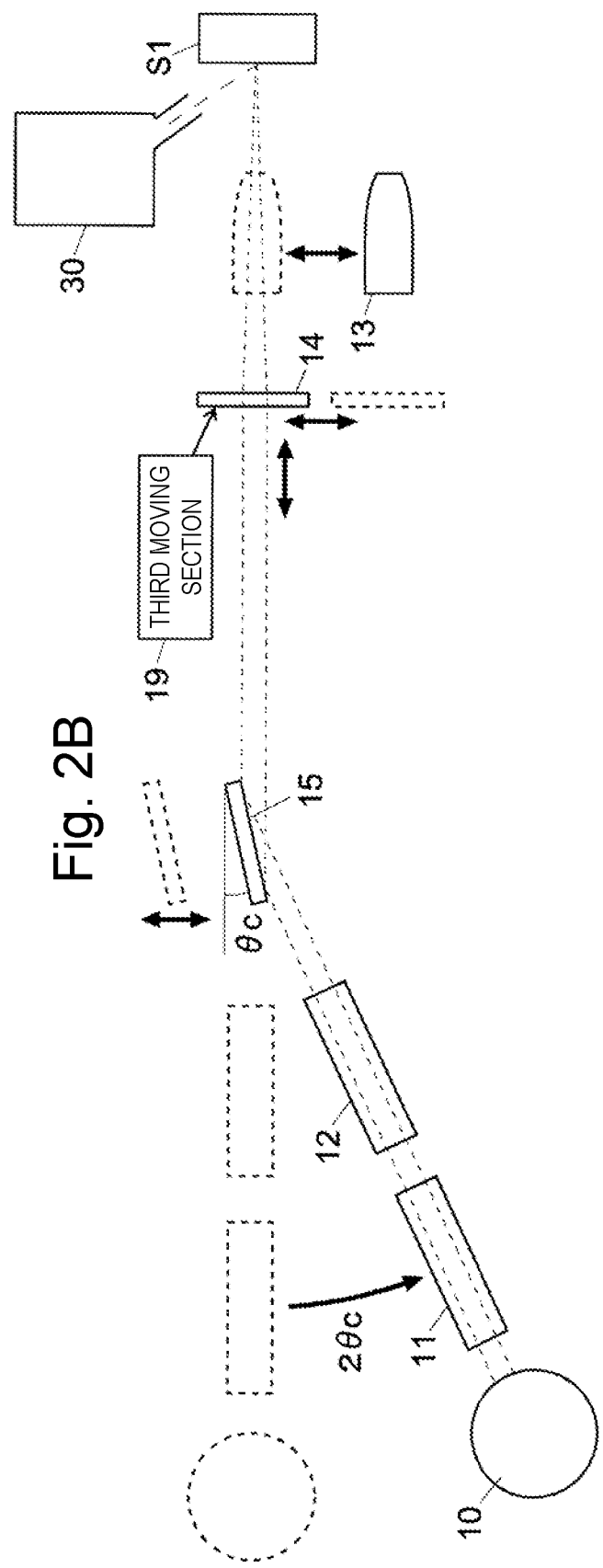
Figure 3:
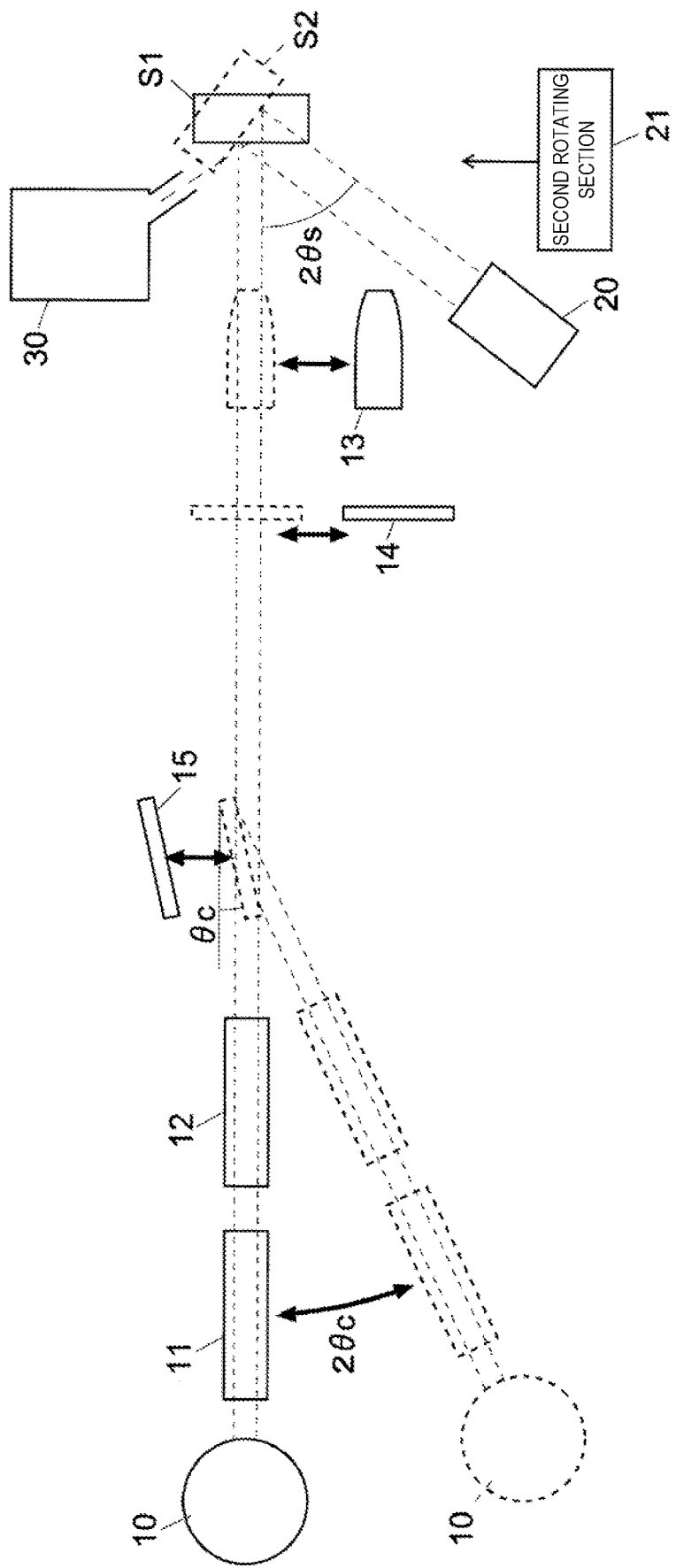
FIG. 3 is a schematic configuration diagram of main parts of an X-ray analyzer according to another embodiment of the present invention.

FIGS. 1A-1B are principle configuration diagrams of the X-ray analyzer according to an embodiment of the present invention. FIGS. 2A-2B are diagrams illustrating a modification of the principle configuration illustrated in FIGS. 1A-1B. FIG. 3 is a schematic configuration diagram of main parts of the X-ray analyzer of this embodiment. First, with reference to FIGS. 1 and 2, the basic configuration of the X-ray irradiation unit in the X-ray analyzer of this embodiment will be described.

FIG. 1A is a diagram illustrating the arrangement of X-ray optical elements in a preliminary analysis mode, and FIG. 1B is a diagram illustrating the arrangement of X-ray optical elements in a microsite analysis mode. These two modes are switchable.

In the configuration illustrated in FIG. 1A, a straight tube type multi-capillary 12, a parallel/point focus type multi-capillary X-ray lens 13, and a sample S1 are arranged on a straight line (central axis C). The X-ray flux emitted from an X-ray source (not illustrated) is introduced into the straight tube type multi-capillary 12, and the X-ray flux passing through the straight tube type multi-capillary 12 is introduced into the parallel/point focus type multi-capillary X-ray lens 13. Then, the X-ray focused by the parallel/point focus type multi-capillary X-ray lens 13 is irradiated to the sample S1. On the other hand, in the configuration illustrated in FIG. 1B, the parallel/point focus type multi-capillary X-ray lens 13 is retracted from the X-ray optical path by a moving mechanism (not illustrated), and a Fresnel zone plate 14 is inserted to a predetermined position on the X-ray optical path. Therefore, the X-ray flux emitted from the straight tube type multi-capillary 12 is introduced into the Fresnel zone plate 14, and the X-ray focused to a minute diameter by the Fresnel zone plate 14 is irradiated to the sample S1.

The straight tube type multi-capillary 12 is an assembly of a large number of capillaries (fine tubes) made of borosilicate glass which extend linearly along the central axis C. In each capillary, X-rays incident parallel to the central axis are emitted without being reflected or absorbed. In addition, X-rays incident at an incident angle equal to or less than the critical angle are guided and emitted while being reflected by the inner wall surface of the capillary. On the other hand, X-rays incident at an incident angle exceeding the critical angle do not reach the exit side end face because they are absorbed or scattered by the inner wall surface of the capillary. Therefore, this straight tube type multi-capillary 12 is a kind of high-efficiency filter having a function of extracting only X-rays having high parallelism.

The parallel/point focus type multi-capillary X-ray lens 13 generally used for accurate analysis of a region of about several tens of μm is an aggregate of a large number of capillaries made of borosilicate glass like the straight tube type multi-capillary 12. However, at the end on the exit side (right side in FIGS. 1A-1B), each capillary is narrowed in a curved shape so as to approach the central axis C. Therefore, the X-rays that are efficiently guided while being reflected by the inner wall surface of the capillary are emitted from the exit side end face so as to be directed toward one point. The efficiency of receiving X-rays at the incident side end face of the parallel/point focus type multi-capillary X-ray lens 13 is high, and the attenuation of X-rays while the X-rays pass through each capillary is small. Therefore, the sample S1 can be irradiated with high-intensity X-rays. However, since the X-rays have a spread of about the critical angle when they are emitted, the diameter of the X-rays irradiated to the sample S1 is generally not minute, but as large as about 50 μm depending on the performance of the parallel/point focus type multi-capillary X-ray lens 13.

That is, in the preliminary analysis mode, high-intensity X-rays can be irradiated to a large area of a certain extent on the sample S1. At this time, if the X-rays incident on the parallel/point focus type multi-capillary X-ray lens 13 are continuous X-rays, the entire irradiation area on the sample S1 is irradiated with the continuous X-rays. Therefore, regardless of whether a light element or a heavy element is present in the area, it is excited by the irradiated X-rays, and a characteristic X-ray corresponding to each element is emitted. By detecting this characteristic X-ray with an X-ray detector (not shown in FIG. 1), the element can be identified, and accurate qualitative analysis can be performed.

On the other hand, the Fresnel zone plate 14 used in the microsite analysis mode has a substantially disk-shaped outer shape, and is a kind of transmission type diffraction grating in which stop regions that stop X-rays and passing regions that allow X-rays to pass are alternately formed concentrically. The distance between the passing regions adjacent to each other in the radial direction gradually narrows from the center to the outside, so that the X-rays incident on the outer peripheral side bend the traveling direction more by diffraction. As a result, the X-rays incident parallel to the central axis of the Fresnel zone plate 14 within the effective diameter range converge to one point at a position separated from the emitting surface on the opposite side of the incident surface by a predetermined distance. In the state of FIG. 1B, the Fresnel zone plate 14 is arranged so that its central axis coincides with the central axis C, and X-rays are applied to a very narrow area on the sample S1.

That is, in the microsite analysis mode, X-rays can be applied to the area of a very small extent on the sample S1, and high spatial resolution can be achieved.

Next, the configuration and operation of the X-ray analyzer of this embodiment will be described with reference to FIGS. 2A-2B. In FIGS. 2A-2B, the same or corresponding components as those illustrated in FIGS. 1A-1B are designated by the same reference numerals.

The X-ray source 10 emits continuous X-rays over a predetermined energy range (wavelength range). The X-ray source 10 and two-stage straight tube type multi-capillaries 11 and 12 are integrally rotatable by a first rotating section 18. Further, a flat plate spectroscopic crystal 15 is movable on the X-ray optical path near the center point of the rotation by a second moving section 17. Further, the flat plate spectroscopic crystal 15 is rotatable by the second moving section 17. Further, a first moving section 16 selectively inserts the parallel/point focus type multi-capillary X-ray lens 13 and the Fresnel zone plate 14 into the X-ray optical path.

In the preliminary analysis mode, as illustrated in FIG. 2A, the X-ray source 10, the two-stage straight tube type multi-capillaries 11 and 12, the parallel/point focus type multi-capillary X-ray lens 13, and the sample S1 are arranged on a straight line. The flat plate spectroscopic crystal 15 is retracted from the X-ray optical path. As a result, continuous X-rays emitted from the X-ray source 10 are irradiated on the sample S1 over a wide area having a diameter of, for example, several tens of μm, and the characteristic X-rays of each element excited by the X-rays are emitted from the sample S1, and detected by the X-ray detector 30.

Figure 6A:
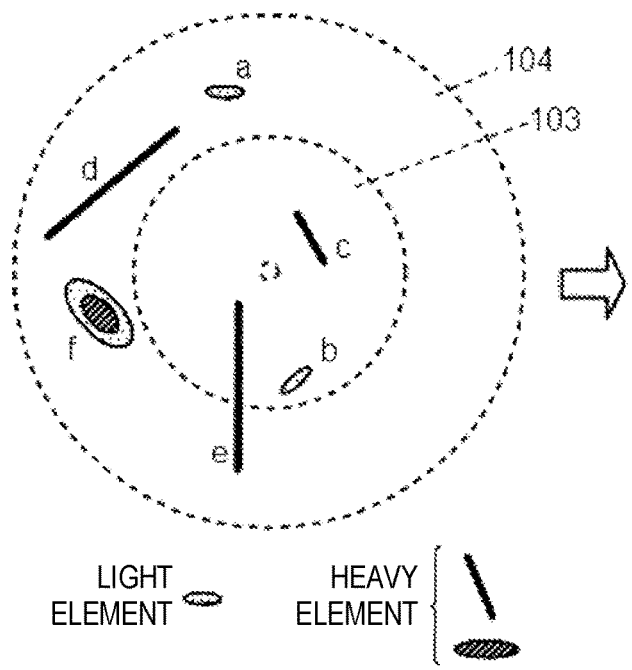
FIGS. 6A-6B are explanatory diagrams of problems of a conventional X-ray analyzer using the Fresnel zone plate.
Figure 6B:
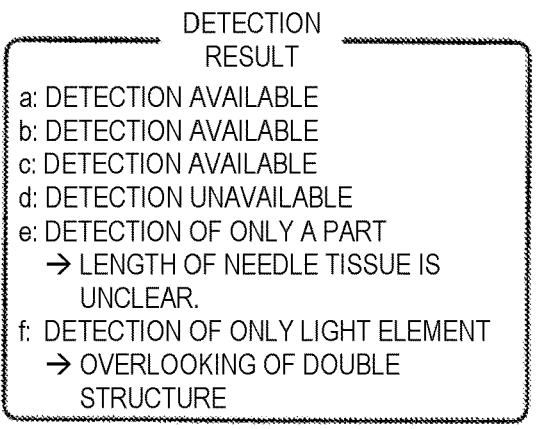
Figure 7:
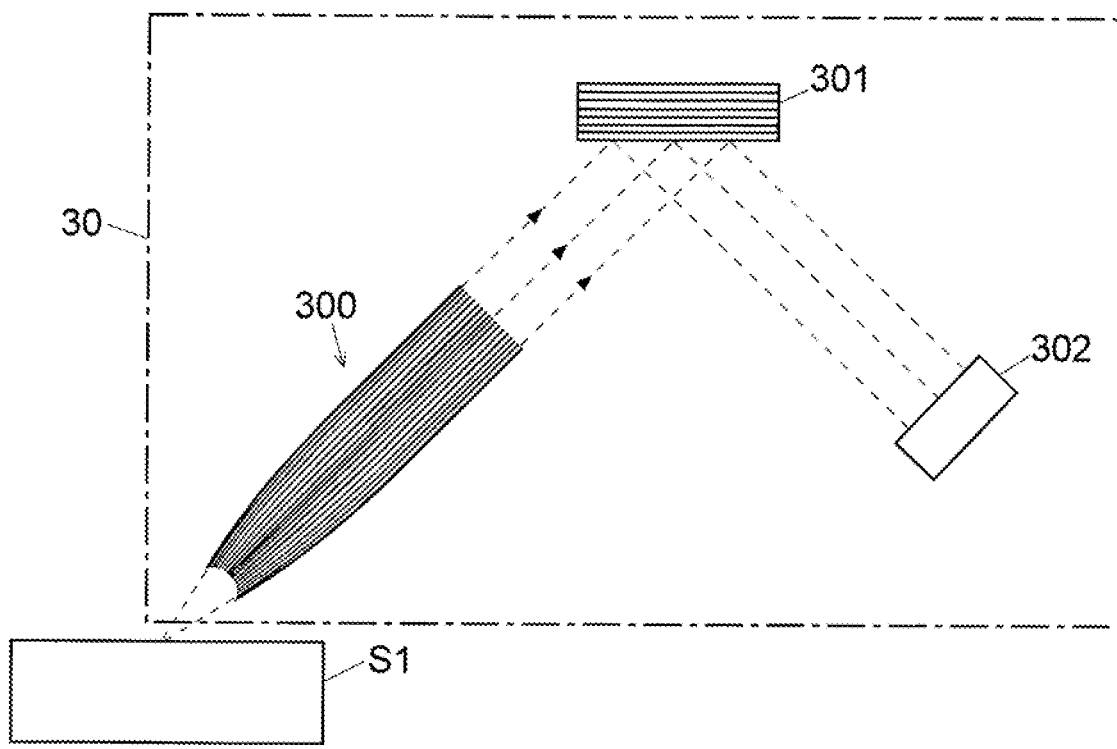
FIG. 7 is a schematic configuration diagram of an example of an X-ray detector in the X-ray analyzer illustrated in FIGS. 2A-2B.

FIG. 7 is a schematic view illustrating an example of the configuration of the X-ray detector 30. This X-ray detector 30 is a wavelength scanning configuration which includes a point/parallel type multi-capillary X-ray lens 300 that collects X-rays (see FIG. 6B of Patent Literature 2 and the like), a flat plate spectroscopic crystal 301 which is rotated by a drive mechanism (not illustrated), and a detector 302 which is rotated at a rotation angle twice the rotation angle of the flat plate spectroscopic crystal 301. As a result, X-rays emitted from a small region on the sample S1 can be detected efficiently and with high accuracy. However, for the purpose of simple analysis, an energy dispersive X-ray detector (specifically, a semiconductor detector) may be used as the X-ray detector 30.

In the microsite analysis mode, the flat plate spectroscopic crystal 15 is inserted on the X-ray optical path as illustrated in FIG. 2B. Then, the X-ray source 10, the two-stage straight tube type multi-capillaries 11 and 12, and the flat plate spectroscopic crystal 15 are rotated in conjunction with each other. Specifically, when the X-ray source 10 and the two-stage straight tube type multi-capillaries 11 and 12 are rotated by an angle $2\theta c$ with respect to the central axis C, the flat plate spectroscopic crystal 15 is rotated by an angle $\theta c$ with respect to the central axis C. In this case, among the continuous X-rays emitted from the X-ray source 10, X-rays having a specific wavelength (energy) corresponding to the angle $\theta c$ are taken out by the flat plate spectroscopic crystal 15 and directed to the Fresnel zone plate 14. Since the parallelism of X-rays emitted through the straight tube type multi-capillaries 11 and 12 is high, accurate monochromation can be easily performed with the flat plate spectroscopic crystal 15, and X-rays with a specific narrow energy range and high parallelism can be easily incident on the Fresnel zone plate 14. As a result, the monochromatic X-rays can be irradiated to a very minute area on the sample S1.

By rotating the X-ray source 10, the two-stage straight tube type multi-capillaries 11 and 12, and the flat plate spectroscopic crystal 15 in conjunction with each other so as to scan the angle $\theta c$ in a predetermined range, it is possible to scan the minute part on the sample S1 with the energy of X-rays irradiating there. For example, it is possible to acquire an X-ray absorption fine structure spectrum that reflects the detailed chemical form of the element.

Figure 5A:
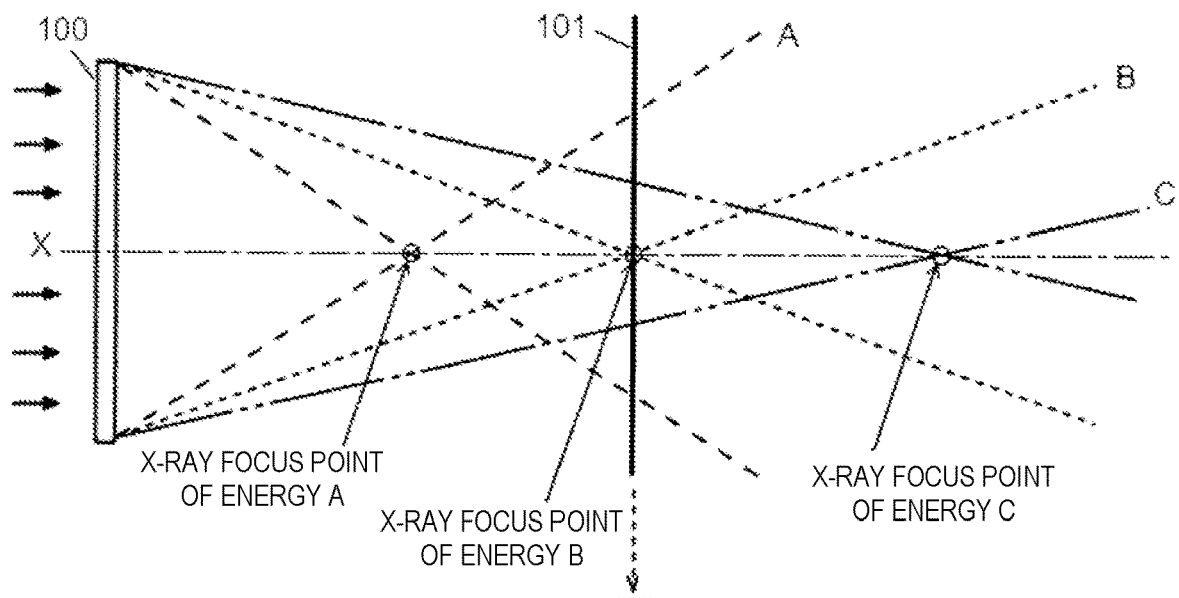
FIGS. 5A-5B are explanatory diagrams of problems of a conventional X-ray analyzer using a Fresnel zone plate.
Figure 5B:
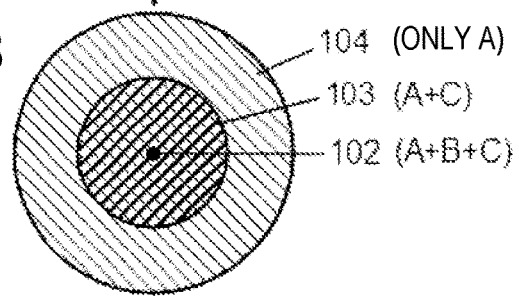

However, as explained in FIGS. 5A-5B, the focal distance of the Fresnel zone plate depends on the energy (wavelength) of X-rays. Therefore, as described above, when the energy of the monochromatic X-rays extracted from the flat plate spectroscopic crystal 15 is changed by rotating the X-ray source 10, the two-stage straight tube type multi-capillaries 11 and 12, and the flat plate spectroscopic crystal 15 in conjunction with each other, the size of the spot on the sample S1 due to the monochromatic X-rays focused on the Fresnel zone plate 14 changes. Therefore, in order to maximize the performance of the Fresnel zone plate and constantly irradiate the smallest possible area on the sample S1 with monochromatic X-rays regardless of the X-ray energy, as illustrated in FIG. 2B, a third moving section 19 which moves the Fresnel zone plate 14 on its optical axis is added, and the movement operation of the Fresnel zone plate 14 by the third moving section 19 and the interlocked rotation operations of the X-ray source 10, the two-stage straight tube type multi-capillaries 11 and 12, and the flat plate spectroscopic crystal 15 may be interlocked. As a result, the sample S1 can be positioned at the focal distance of the Fresnel zone plate 14 even when the X-ray energy changes.

In addition, continuous X-rays may be introduced into the Fresnel zone plate 14 without interlocking the operations of the first rotating section 18, the second moving section 17, and the first moving section 16, and continuous X-rays may be introduced to a minute part on the sample S1. In addition, X-rays having a specific energy may be introduced to the parallel/point focus type multi-capillary X-ray lens 13, and a relatively wide area on the sample S1 may be irradiated with the X-rays having a specific energy.

FIG. 3 is a schematic configuration diagram of an X-ray analyzer according to another embodiment of the present invention. With this X-ray analyzer, not only X-ray fluorescence analysis but also X-ray diffraction analysis is possible. The components that are the same as or correspond to the components illustrated in FIGS. 2A-2B are designated by the same reference numerals in FIG. 3.

In this X-ray analyzer, a sample holder (not illustrated) provided at the placement position of the sample S1 and an X-ray diffraction analysis detector 20 arranged at a position where the X-ray diffracted by the X-ray diffraction analysis sample S2 held in the sample holder reaches are each rotated by a second rotating section 21. In addition, both the parallel/point focus type multi-capillary X-ray lens 13 and the Fresnel zone plate 14 can be retracted from the X-ray optical path.

At the time of X-ray diffraction analysis, both the parallel/point focus type multi-capillary X-ray lens 13 and the Fresnel zone plate 14 are retracted from the X-ray optical path, and the sample S2 is irradiated with the parallel X-ray flux of the continuous X-ray emitted from the straight tube type multi-capillary 12 or the monochromatic parallel X-ray flux emitted from the flat plate spectroscopic crystal 15. In this case, since the X-rays are not narrowed down, the parallel X-ray flux hits a wide area on the sample S2, and the X-rays diffracted to the parallel X-rays reach the X-ray diffraction analysis detector 20. Therefore, even if the sample S2 is a bulk sample, for example, the crystal structure of the sample can be analyzed by acquiring the diffraction pattern. Further, when the sample S2 is rotated by the angle $\theta s$ by the second rotating section 21 and the X-ray diffraction analysis detector 20 is rotated by the angle $2\theta s$ in conjunction with this, the diffraction angle can be scanned or changed. Thereby, the diffracted X-rays emitted from the sample S2 at various angles can be detected.

Figure 4:
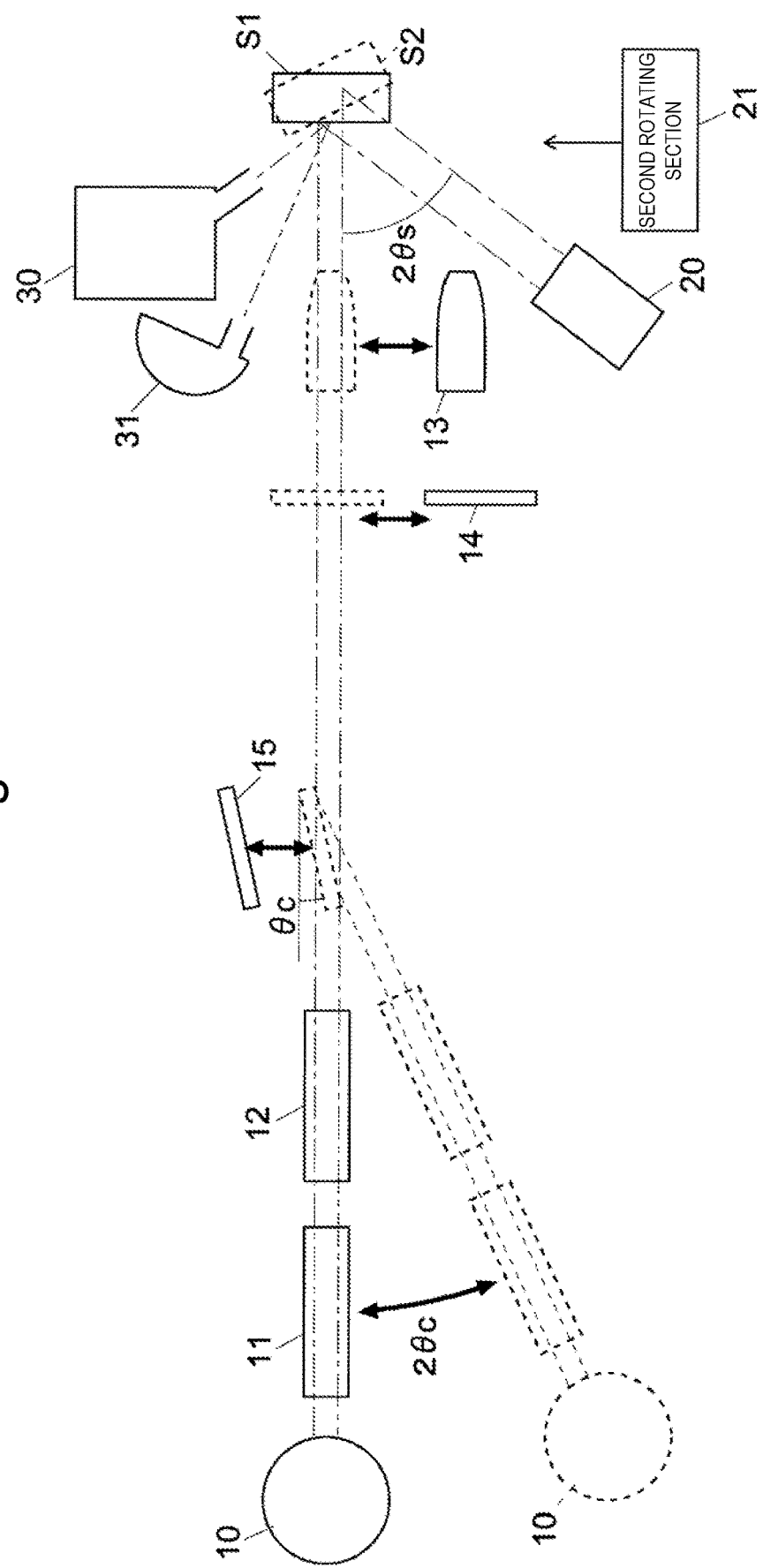
FIG. 4 is a schematic configuration diagram of main parts of an X-ray composite analysis device according to still another embodiment of the present invention.

FIG. 4 is a schematic configuration diagram of an X-ray composite analysis device according to still another embodiment of the present invention. In addition to X-ray fluorescence analysis and X-ray diffraction analysis, this X-ray composite analysis device can also perform X-ray photoelectron spectroscopic analysis and near-wide-area spectroscopic analysis of the absorption edge spectrum. The components that are the same as or correspond to the components illustrated in FIGS. 2 and 3 are designated by the same reference numerals in FIG. 4.

This X-ray composite analysis device is provided with a photoelectron spectroscopic detector 31 at a position facing the X-ray irradiation surface of the sample S1. The photoelectron spectroscopic detector 31 receives photoelectrons emitted from the sample S1 by X-ray irradiation, counts the number of photoelectrons for each kinetic energy, and can obtain an energy spectrum of photoelectrons.

In this X-ray composite analysis device, X-ray fluorescence analysis for the sample S1 and X-ray diffraction analysis for the sample S2 can be performed in the same manner as the device of the embodiment illustrated in FIG. 3. Further, X-ray photoelectron spectroscopic analysis and X-ray absorption fine structure analysis for the sample S1 can also be performed.

During the X-ray photoelectron spectroscopic analysis, the plate spectroscopic crystal 15 is inserted on the X-ray optical path, as in the microsite analysis mode of the X-ray fluorescence analysis, and the X-ray source 10 and the straight tube type multi-capillaries 11 and 12 are rotated to a predetermined position with respect to the flat plate spectroscopic crystal 15. In addition, the Fresnel zone plate 14 or the parallel/point focus type multi-capillary X-ray lens 13 is inserted on the X-ray optical path. As a result, the sample S is irradiated with X-rays that have been monochromated and appropriately narrowed down. Both the Fresnel zone plate 14 and the parallel/point focus type multi-capillary X-ray lens 13 may be retracted from the X-ray optical path. In that case, the sample S is irradiated with monochromatic parallel X-rays. Photoelectrons are generated on the surface of the sample S1 by being irradiated with X-rays, and the kinetic energy of the photoelectrons depends on the type of element and the like. The photoelectron spectroscopic detector 31 outputs energy spectrum data illustrating the relationship between the kinetic energy of incident photoelectrons and the electron intensity. As a result, elemental analysis and state analysis of the very surface of the sample S1 can be performed.

Generally, the sample is placed in vacuum during X-ray photoelectron spectroscopic analysis. Therefore, it is desirable to place the sample S1 in a container that can be evacuated inside, and if necessary, evacuate the inside of the container to perform the analysis.

At the time of X-ray absorption fine structure analysis, the flat plate spectroscopic crystal 15 is inserted on the X-ray optical path, and the X-ray source 10, the straight tube type multi-capillaries 11 and 12, and the flat plate spectroscopic crystal 15 are rotated in conjunction with each other. Further, the Fresnel zone plate 14 or the parallel/point focus type multi-capillary X-ray lens 13 is inserted on the X-ray optical path. As a result, the sample S is irradiated with X-rays that have been monochromated and appropriately narrowed down, and scanning is performed using the energy of the X-rays in a predetermined range. The X-ray detector 30 detects the intensity of the X-ray emitted from the sample S1 in response to the irradiation of the energy of X-ray used for energy scanning, and acquires an absorption spectrum. Since the absorption edge peculiar to the element in the sample S1 is observed in the absorption spectrum, the electronic structure of the atom can be grasped from this.

As described above, according to the X-ray composite analysis device of this embodiment, it is possible to perform X-ray analysis of a sample by various methods with one device.

Since all of the above embodiments are examples of the present invention, it is natural that they are included in the claims of the present application even if they are appropriately modified, modified or added within the scope of the present invention.

REFERENCE SIGNS LIST

10 . . . X-ray Source
11, 12 . . . Straight Tube Type Multi-Capillary
13 . . . Parallel/Point Focus Type Multi-Capillary X-ray Lens
14 . . . Fresnel Zone Plate
15 . . . Flat Plate Spectroscopic Crystal
16 . . . First Moving Section
17 . . . Second Moving Section
18 . . . First Rotating Section
19 . . . Third Moving Section
20 . . . X-ray Diffraction Analysis Detector
21 . . . Second Rotating Section
23 . . . Straight Tube Tapered Multi-Capillary
30 . . . X-ray Detector
31 . . . Photoelectron Spectroscopic Detector
C . . . Central Axis

The invention claimed is:

1. An X-ray analyzer for irradiating a sample containing various components with X-rays to detect X-rays emitted from the sample, wherein an X-ray irradiation unit that irradiates the sample with X-rays includes
   a) an X-ray source configured to emit X-rays,
   b) a first multi-capillary which is composed of a large number of X-ray guiding capillaries parallel to each other, and has an incident end face arranged at a position where X-rays emitted from the X-ray source are introduced,
   c) a second multi-capillary which is composed of a large number of X-ray guiding capillaries, and is a parallel/point focus multi-capillary X-ray lens formed such that the capillaries are parallel on an incident end side and converged in a tapered shape mildly curved on an exit end side,
   d) a Fresnel zone plate, and
   e) a first moving section configured to move the second multi-capillary and the Fresnel zone plate such that one of the second multi-capillary and the Fresnel zone plate is selectively inserted on an X-ray optical path from the first multi-capillary to the sample.

2. The X-ray analyzer according to claim 1, further comprising a first X-ray detector configured to detect X-rays emitted from the sample in response to the X-rays irradiated to the sample through the second multi-capillary or the Fresnel zone plate.

3. The X-ray analyzer according to claim 2, wherein the X-ray irradiation unit further includes a first rotating section configured to integrally rotate the X-ray source and the first multi-capillary, a flat plate spectroscopic crystal, and a second moving section configured to move the flat plate spectroscopic crystal such that the flat plate spectroscopic crystal is located at a position where the X-ray emitted from an exit end face of the first multi-capillary reaches.

4. The X-ray analyzer according to claim 3, further comprising a second X-ray detector which is placed at a position where an X-ray diffracted from an X-ray diffraction analysis sample placed at a position where the sample is placed is able to detected, and a second rotating section configured to rotate the X-ray diffraction analysis sample and the second X-ray detector while maintaining a predetermined relationship,
   wherein the second multi-capillary and the Fresnel zone plate are both retracted from an optical path of an X-ray emitted from the first multi-capillary or of an X-ray emitted from the first multi-capillary and extracted from the flat plate spectroscopic crystal after hitting the flat plate spectroscopic crystal, and a diffracted X-ray corresponding to an X-ray irradiated to the X-ray diffraction analysis sample is detected by the second X-ray detector.

5. The X-ray analyzer according to claim 3, further comprising a third moving section configured to move the Fresnel zone plate on an optical axis,
   wherein the third moving section and the first rotating section are controlled such that a position on an optical axis of the Fresnel zone plate and an energy or wavelength of an X-ray extracted from the flat plate spectroscopic crystal are changed in conjunction with each other so as to constantly position the sample at a focal distance position of an X-ray having a predetermined energy or wavelength.

6. The X-ray analyzer according to claim 4, further comprising a third moving section configured to move the Fresnel zone plate on an optical axis,
wherein the third moving section and the first rotating section are controlled such that a position on an optical axis of the Fresnel zone plate and an energy or wavelength of an X-ray extracted from the flat plate spectroscopic crystal are changed in conjunction with each other so as to constantly position the sample at a focal distance position of an X-ray having a predetermined energy or wavelength.

7. The X-ray analyzer according to claim 3, further comprising a photoelectron spectroscopic detector configured to detect photoelectrons emitted from the sample in response to irradiation of an X-ray extracted by the flat plate spectroscopic crystal.

8. The X-ray analyzer according to claim 3, wherein the X-ray source and the first multi-capillary are integrally rotated by the first rotating section, and an X-ray emitted from the sample in response to the irradiation of an X-ray extracted by the flat plate spectroscopic crystal is detected so as to acquire an absorption edge spectrum.

* * * * *